US009951742B2

(12) United States Patent
Shiraishi et al.

(10) Patent No.: US 9,951,742 B2
(45) Date of Patent: Apr. 24, 2018

(54) IGNITION CONTROL SYSTEM FOR INTERNAL COMBUSTION ENGINE AND IGNITION CONTROL METHOD

(71) Applicant: NISSAN MOTOR CO., LTD., Yokohama-shi, Kanagawa (JP)

(72) Inventors: Taisuke Shiraishi, Kawasaki (JP); Tatsuya Yaguchi, Yokohama (JP); Hirofumi Maeda, Tokyo (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 10 days.

(21) Appl. No.: 14/777,857

(22) PCT Filed: Dec. 16, 2013

(86) PCT No.: PCT/JP2013/083619
§ 371 (c)(1),
(2) Date: Sep. 17, 2015

(87) PCT Pub. No.: WO2014/147909
PCT Pub. Date: Sep. 25, 2014

(65) Prior Publication Data
US 2016/0341172 A1 Nov. 24, 2016

(30) Foreign Application Priority Data
Mar. 21, 2013 (JP) ................................ 2013-057494

(51) Int. Cl.
F02P 5/15 (2006.01)
F02D 41/00 (2006.01)
(Continued)

(52) U.S. Cl.
CPC ........ F02P 5/1504 (2013.01); F02D 41/0065 (2013.01); F02M 26/22 (2016.02);
(Continued)

(58) Field of Classification Search
CPC ........ F02P 5/1516; F02P 5/1504; F02P 9/002; F02P 9/007; F02D 2041/2051;
(Continued)

(56) References Cited

U.S. PATENT DOCUMENTS 3,828,752 A * 8/1974 Hioki ...................... F02D 21/08
123/640
4,349,008 A * 9/1982 Wainwright ............ F02P 9/007
123/598
(Continued)

FOREIGN PATENT DOCUMENTS

JP 61-164072 A 7/1986
JP 2554568 B2 11/1996
(Continued)

Primary Examiner — Sizo Vilakazi
Assistant Examiner — Brian Kirby
(74) Attorney, Agent, or Firm — Foley & Lardner LLP

(57) ABSTRACT

An ignition device for an internal combustion engine (1) includes a superpose voltage generation circuit (47) that, after the initiation of a discharge with the application of a discharge voltage by a secondary coil, applies a superpose voltage between electrodes of an ignition plug (29) in the same direction as the discharge voltage to continue a discharge current, and performs a superposed discharge in a superposed discharge activation range of high exhaust recirculation rate. Upon shift from the superposed discharge activation range of high exhaust recirculation rate to a superposed discharge deactivation range of low exhaust recirculation rate, the deactivation of the superposed discharge is delayed by a delay time ΔT. Although the exhaust gas recirculation rate becomes temporarily increased with decrease in intake air after the closing of an exhaust gas recirculation control valve, the superposed discharge is continued for the delay time ΔT so as to avoid misfiring.

12 Claims, 13 Drawing Sheets

(51) Int. Cl.
*F02P 9/00* (2006.01)
*F02M 26/22* (2016.01)
*F02D 21/08* (2006.01)
*F02B 75/12* (2006.01)
*F02D 41/38* (2006.01)

(52) U.S. Cl.
CPC .............. *F02P 9/002* (2013.01); *F02P 9/007* (2013.01); *F02B 2075/125* (2013.01); *F02D 2021/083* (2013.01); *F02D 2041/389* (2013.01); *Y02T 10/46* (2013.01); *Y02T 10/47* (2013.01)

(58) Field of Classification Search
CPC .......... F02D 41/0065; F02D 2021/083; F02D 2041/389; F02M 26/22; F02B 2075/125; Y02T 10/47
USPC .......... 123/601, 605, 617, 620, 623, 406.44, 123/406.45, 406.48, 406.65
See application file for complete search history.

(56) References Cited

U.S. PATENT DOCUMENTS

| | | | | |
|---|---|---|---|---|
| 4,448,178 A * | 5/1984 | Yamato | ............... | F02D 41/005 123/486 |
| 4,493,306 A * | 1/1985 | Asik | ............... | F02P 3/051 123/620 |
| 4,631,451 A * | 12/1986 | Anderson | ............... | H01T 13/52 123/620 |
| 4,886,036 A * | 12/1989 | Johansson | ............... | F02P 3/093 123/596 |
| 4,898,143 A * | 2/1990 | Fujimoto | ............... | F02D 41/005 123/568.22 |
| 4,915,087 A * | 4/1990 | Boyer | ............... | F02P 7/035 123/620 |
| 4,947,820 A * | 8/1990 | Kushi | ............... | F02D 41/0065 123/406.48 |
| 5,383,126 A * | 1/1995 | Ogawa | ............... | F02D 41/0072 123/406.48 |
| 5,505,174 A * | 4/1996 | Komoriya | ............... | F02D 41/0072 123/406.48 |
| 5,777,216 A * | 7/1998 | Van Duyne | ............... | F02P 9/007 324/378 |
| 5,913,302 A * | 6/1999 | Ruman | ............... | F02B 77/04 123/609 |
| 5,954,024 A * | 9/1999 | Duhr | ............... | F02P 15/08 123/310 |
| 6,026,792 A * | 2/2000 | McDowell | ............... | F02B 61/045 123/620 |
| 6,125,829 A * | 10/2000 | Heinitz | ............... | F02D 21/08 123/568.21 |
| 6,155,241 A * | 12/2000 | Hohner | ............... | F02P 17/12 123/406.24 |
| 6,550,463 B1* | 4/2003 | Schmolla | ............... | F02P 3/005 123/605 |
| 7,240,670 B2* | 7/2007 | Alger, II | ............... | F02P 3/02 123/620 |
| 7,644,698 B2* | 1/2010 | Shiraishi | ............... | F01L 13/0026 123/146.5 R |
| 7,934,486 B1* | 5/2011 | Styles | ............... | F01N 3/2066 123/406.23 |
| 7,966,992 B2* | 6/2011 | Glugla | ............... | F02D 35/021 123/345 |
| 8,078,384 B2* | 12/2011 | Glugla | ............... | F02P 15/08 123/637 |
| 8,627,804 B2* | 1/2014 | Kang | ............... | F02D 41/0062 123/406.44 |
| 2002/0007821 A1* | 1/2002 | Isobe | ............... | F02D 41/0055 123/480 |
| 2002/0056445 A1* | 5/2002 | Inagaki | ............... | F02P 3/0456 123/609 |
| 2003/0106530 A1* | 6/2003 | Kitajima | ............... | F02D 37/02 123/406.48 |
| 2006/0021607 A1* | 2/2006 | Toriyama | ............... | F02P 3/0838 123/598 |
| 2009/0018751 A1* | 1/2009 | Buckland | ............... | F02B 37/007 701/103 |
| 2009/0031988 A1* | 2/2009 | Shiraishi | ............... | F01L 13/0026 123/406.19 |
| 2009/0126684 A1* | 5/2009 | Shiraishi | ............... | F02D 41/3041 123/406.15 |
| 2010/0132666 A1* | 6/2010 | Sato | ............... | F02P 9/007 123/406.19 |
| 2010/0204907 A1* | 8/2010 | Nakatani | ............... | F02D 13/0234 701/108 |
| 2010/0206267 A1* | 8/2010 | Glugla | ............... | F02D 35/021 123/406.26 |
| 2010/0235070 A1* | 9/2010 | Amano | ............... | B60K 6/365 701/103 |
| 2011/0132283 A1* | 6/2011 | Czekala | ............... | F02D 37/02 123/3 |
| 2011/0265463 A1* | 11/2011 | Kojima | ............... | F01N 3/2073 60/299 |
| 2012/0023937 A1* | 2/2012 | Styles | ............... | F02D 9/02 60/605.2 |
| 2012/0330534 A1* | 12/2012 | Cleeves | ............... | F02D 37/02 701/104 |

FOREIGN PATENT DOCUMENTS

| | | |
|---|---|---|
| JP | 10-184510 A | 7/1998 |
| JP | 2000-240542 A | 9/2000 |
| JP | 2008-121462 A | 5/2008 |
| JP | 2011-080381 A | 4/2011 |

* cited by examiner

IGNITION CONTROL SYSTEM FOR INTERNAL COMBUSTION ENGINE AND IGNITION CONTROL METHOD

FIELD OF THE INVENTION

The present invention relates to a technique for ignition of an internal combustion engine using an ignition coil assembly with primary and secondary coils and, more particularly, to an ignition control system and method for performing a superposed discharge with the application of a superpose voltage so as to compensate for a combustion deterioration of the internal combustion engine caused due to exhaust gas recirculation.

BACKGROUND ART

An ignition device is provided, including an ignition coil assembly with primary and secondary coils and an ignition plug connected to the secondary coil so as to, after the supply of a primary current to the primary coil, develop a high discharge voltage across the secondary coil by interruption of the primary current at a given ignition timing and thereby generate a discharge between electrodes of the ignition plug. The discharge voltage developed across the secondary coil and the magnitude of the discharge energy basically depend on the energization time of the primary coil.

Patent Document 1 discloses a technique to apply a superpose voltage to the ignition plug by another voltage booster during a discharge period after the ignition timing for the purpose of increasing the discharge period for reliable ignition. This technique enables, after the initiation of a discharge between the electrodes of the ignition plug with the application of the secondary voltage by the ignition coil assembly, a continuation of discharge current with the application of the superpose voltage to impart greater energy to air-fuel mixture.

For reduction of pumping loss and improvement of fuel efficiency, it is known practice to recirculate a relatively large amount of exhaust gas into a combustion chamber by external exhaust gas recirculation (abbreviated as "external EGR") with the use of an exhaust gas recirculation passage from an exhaust system to an intake system or by internal exhaust gas recirculation (abbreviated as "internal EGR") with the control of an overlap between an intake valve and an exhaust valve. However, such exhaust gas recirculation leads to a deterioration in the ignition performance of the ignition plug.

PRIOR ART DOCUMENTS

Patent Document

Patent Document 1: Japanese Patent No. 2554568

SUMMARY OF THE INVENTION

In view of the foregoing, it is an object of the present invention to improve ignition performance during exhaust gas recirculation by adoption of the above-mentioned superposed discharge technique and, at the same time, suppress misfiring or waste of energy consumption by appropriate switching between activation and deactivation of the superposed discharge in a transition state upon changeover of the execution/non-execution or the degree of execution of the exhaust gas recirculation.

According to the present invention, there is provided an ignition control system for an internal combustion engine, comprising an ignition coil assembly having primary and secondary coils and an ignition plug connected to the secondary coil so as to allow, after the supply of a primary current to the primary coil, the secondary coil to apply a discharge voltage between electrodes of the ignition plug by interruption of the primary current, wherein the ignition control system further comprises a superpose voltage generation circuit that, after the initiation of a discharge with the application of the discharge voltage by the secondary coil, applies a superpose voltage between the electrodes of the ignition plug in the same direction as the discharge voltage so as to continue a discharge current, wherein the ignition control system has two ranges set with respect to an operation status of the internal combustion engine in accordance with the execution/non-execution or the degree of execution of exhaust gas recirculation, which include a superposed discharge activation range where the superpose voltage generation circuit applies the superpose voltage and a superposed discharge deactivation range where the superpose voltage generation circuit applies no superpose voltage, and wherein the ignition control system delays switching between activation and deactivation of the superposed discharge by a predetermined delay time in a transition state upon shift from one of the two ranges to the other range.

In the present invention, the superposed discharge activation range and the superposed discharge deactivation range are set in accordance with the execution/non-execution or the degree of execution of exhaust gas recirculation. In the case where the engine operation status is in the superposed discharge activation range, the superposed discharge is performed in conjunction with the execution of exhaust gas recirculation (or the execution of exhaust gas recirculation at a high exhaust gas recirculation rate). In the case where the engine operation status is in the superposed discharge deactivation range, the superposed discharge is stopped in conjunction with the non-execution of exhaust gas recirculation (or the execution of exhaust gas recirculation at a low exhaust gas recirculation rate).

It is herein assumed that the engine operation status shifts from the superposed discharge activation range to the superposed discharge deactivation range or shifts from the superposed discharge deactivation range to the superposed discharge activation range. In this case, the control state of the exhaust gas recirculation is immediately changed. On the other hand, the switching between the activation and deactivation of the superposed discharge is delayed by the predetermined delay time.

For example, the actual decrease of recirculated exhaust gas in the combustion chamber is slow in the case where the exhaust gas recirculation rate is changed over from a high exhaust gas recirculation rate to a low exhaust gas recirculation rate (or the exhaust gas recirculation is changed over from execution to non-execution) upon shift from one range to the other range. There is thus a possibility of occurrence of misfiring if the superposed discharge is immediately stopped. In particular, the amount of intake air introduced into the combustion chamber decreases at the time of shifting from the superposed discharge activation range to the superposed discharge deactivation range (i.e. changeover from a from a high exhaust gas recirculation rate to a low exhaust gas recirculation rate) with decrease in load. This may result in a temporary increase of the exhaust gas recirculation rate due to slow decrease of recirculated exhaust gas so that misfiring becomes more likely to occur.

In the present invention, however, the superposed discharge is performed continuously until the lapse of the predetermined delay time. It is accordingly possible to avoid misfiring.

In the case where the exhaust gas recirculation rate is changed over from a low exhaust gas recirculation rate to a high exhaust gas recirculation rate (or the exhaust gas recirculation is changed over from non-execution to execution) upon shift from one range to the other range, the actual increase of recirculated exhaust gas in the combustion chamber is slow. If the superposed discharge is immediately initiated, there occurs wasted consumption of discharge energy.

However, the superposed discharge is initiated after the lapse of the predetermined delay time in the present invention. It is accordingly possible to suppress waste of discharge energy.

One preferred aspect of the present invention is that the delay time equals to the entire exhaust gas recirculation transition period during which the degree of exhaust gas recirculation in the combustion chamber reaches a steady state corresponding to the engine operation status after the shift.

Another preferred aspect of the present invention is that the delay time ends in the mid-course of the exhaust gas recirculation transition period.

In the present invention, it is possible by the superposed discharge to compensate for a combustion deterioration of the internal combustion engine caused due to exhaust gas recirculation. It is particularly possible to reliably avoid misfiring and suppress waster of energy combustion relative to the shift of the engine operation status between the superposed discharge activation range and the superposed discharge deactivation range in accordance with the execution/non-execution or the degree of execution of exhaust gas recirculation.

DESCRIPTION OF EMBODIMENTS

Hereinafter, one exemplary embodiment of the present invention will be described in detail below with reference to the drawings.

Figure 1:
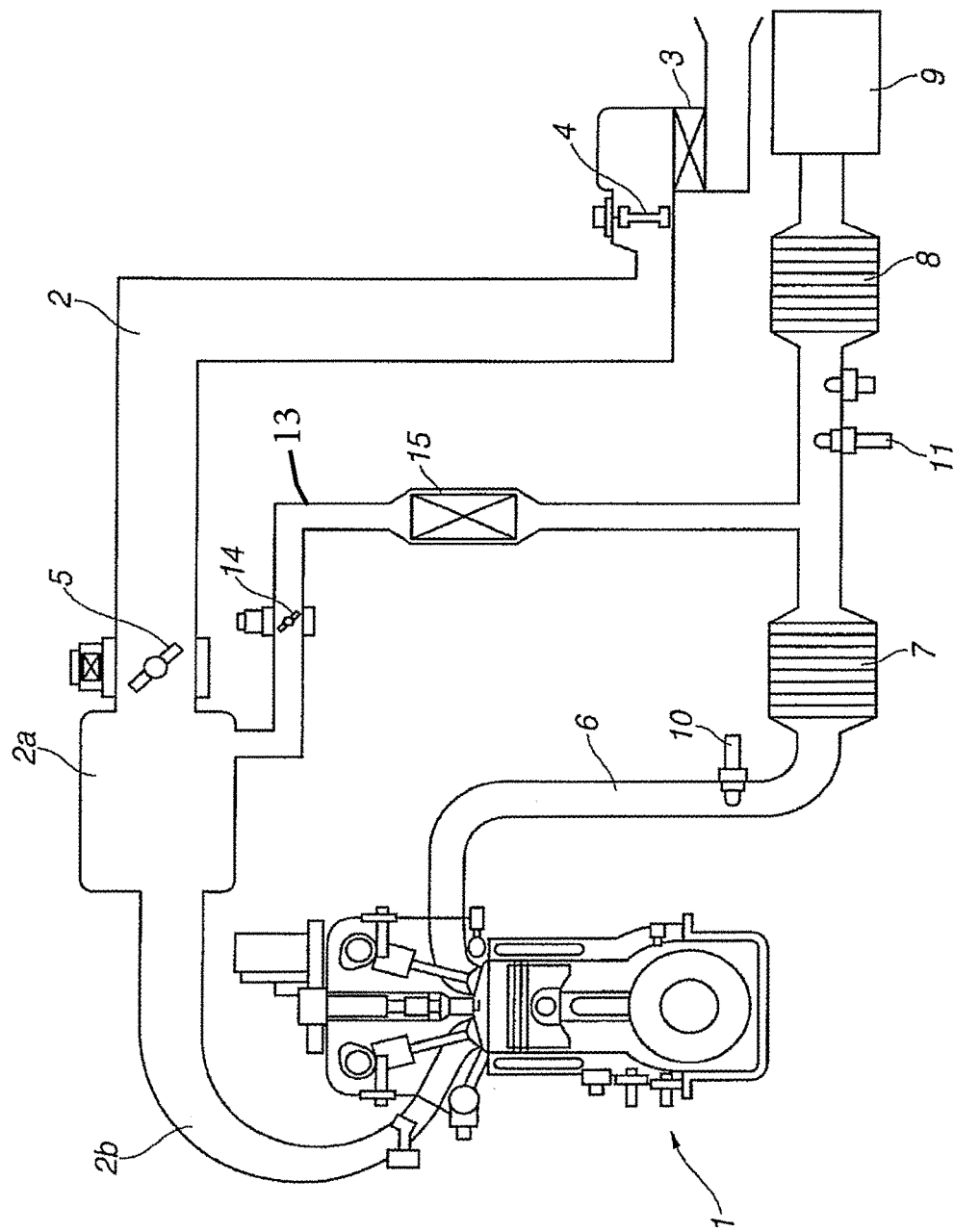
FIG. 1 is a schematic view of an internal combustion engine to which the present invention is applicable.

FIG. 1 is a schematic view of an internal combustion engine 1 to which an ignition control system according to one exemplary embodiment of the present invention is applied. In an intake passage 2 of the internal combustion engine 1, an air cleaner 3, an air flow meter 4 and a throttle valve 5 are disposed in order of mention from the upstream side. In an exhaust passage 6 of the internal combustion engine 1, an upstream-side catalytic converter 7, a downstream-side catalytic converter 8 and a muffler 9 are disposed in order of mention from the upstream side. An upstream-side air-fuel ratio sensor 10 and a downstream-side air-fuel ratio sensor 11 are arranged on upstream and downstream sides of the upstream-side catalytic converter 7, respectively. An exhaust gas recirculation passage 13 is branched off from a part of the exhaust passage 6 between the upstream-side catalytic converter 7 and the downstream-side catalytic converter 8. An end of the exhaust gas recirculation passage 13 is connected to a part of the intake passage 2 downstream of the throttle valve 5 and, more specifically, connected to a collector portion 2a. The collector portion 2a is formed with a relatively large volumetric capacity and connected to a plurality of branch portions 2b. The branch portions 2b are formed on a downstream side of the collector 2a and branched to respective cylinders of the engine.

An exhaust gas recirculation control valve 14 is disposed in the exhaust gas recirculation passage 13 so as to control the rate of exhaust gas recirculation. An EGR gas cooler 15 is disposed on an upstream side (exhaust system side) of the exhaust gas recirculation control valve 14 so as to cool high-temperature exhaust gas by heat exchange with a coolant or outside air.

Figure 2:
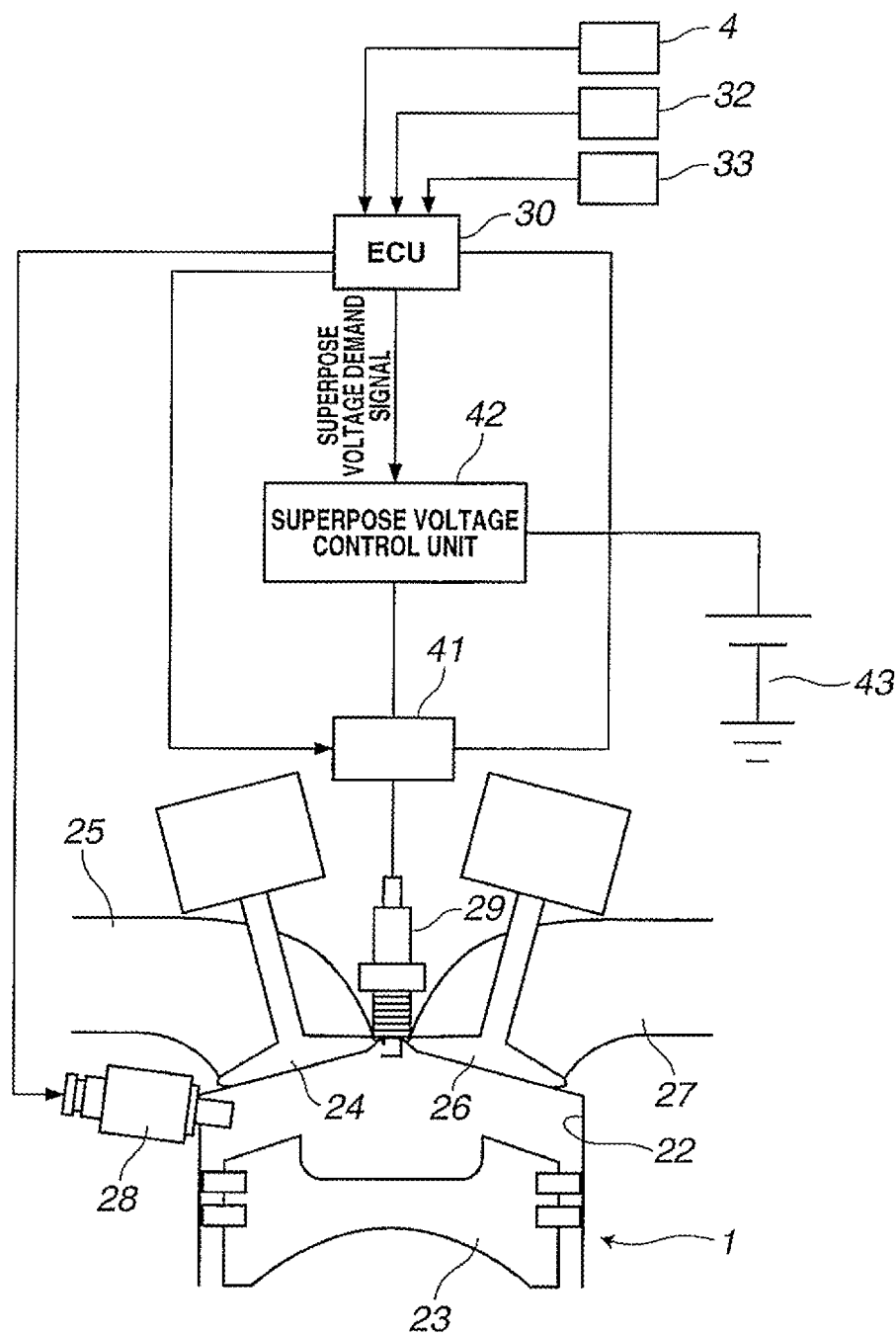
FIG. 2 is a schematic view of an ignition control system according to one exemplary embodiment of the present invention.

FIG. 2 is a schematic view of the ignition control system in the internal combustion engine 1. In the internal combustion engine 1, a plurality of cylinders 22 are each equipped with a piston 23. Intake and exhaust ports 25 and 27 are connected to each of the cylinders 22. An intake valve 24 is disposed to open and close the intake port 25, whereas an exhaust valve 26 is disposed to open and close the exhaust port 27. The intake and exhaust passages 2 and 6 are connected to the intake and exhaust ports 25 and 27, respectively. A fuel injection valve 28 is disposed in the internal combustion engine 1 so as to inject fuel into each cylinder. The fuel injection timing and fuel injection amount of the fuel injection valve 28 are controlled by an engine control unit (ECU) 30. Further, an ignition plug 29 is disposed e.g. at the center of the top of the cylinder so as to ignite air-fuel mixture formed by the fuel injection valve 28 in the cylinder. Although the internal combustion engine is of the direct-injection type in the present embodiment, the internal combustion engine may alternatively be of the port injection type where the fuel injection valve is disposed in the intake port 25.

The engine control unit 30 is in communication with various sensors, including not only the air flow meter 4 to detect the amount of intake air but also an crank angle sensor 32 to detect the rotation speed of the engine and a temperature sensor 33 to detect the temperature of the coolant, so that detection signals of these sensors are inputted into the engine control unit 30.

An ignition unit 41 is connected to the ignition plug 29 and arranged to apply a discharge voltage to the ignition plug 29 according to an ignition signal from the engine control unit 30. A superpose voltage control unit 42 is arranged to control the application of a superpose voltage by the ignition unit 41 according to a superpose voltage demand signal from the engine control unit 30. Each of the engine control unit 30, the ignition unit 41 and the superpose voltage control unit 42 is connected to a vehicle-mounted battery 43 of 14 volt.

Figure 3:
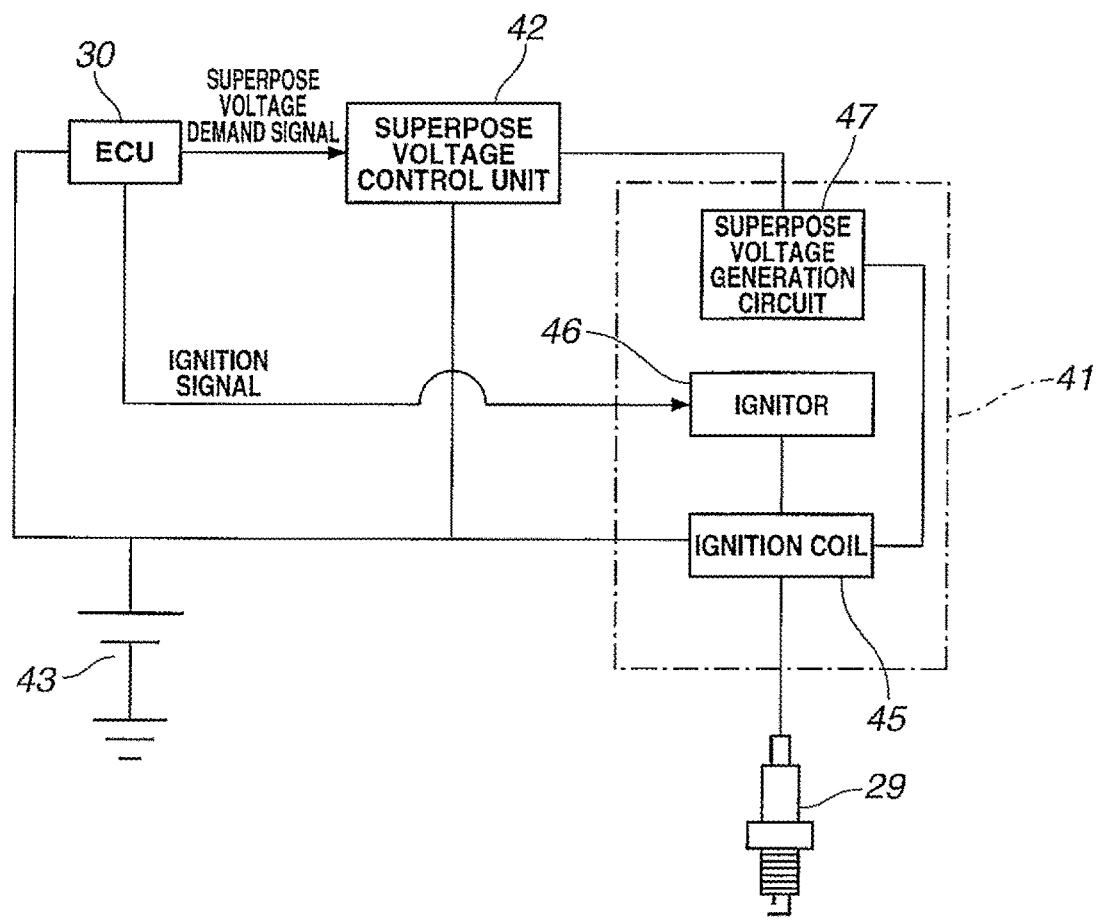
FIG. 3 is a schematic view of substantive part of the ignition control system.

As shown in detail in FIG. 3, the ignition unit 41 has an ignition coil assembly 45 with primary and secondary coils (not specifically shown), an igniter 46 arranged to control the supply or interruption of a primary current to the primary coil of the ignition coil assembly 45, a superpose voltage generation circuit 47 equipped with a voltage booster. The ignition plug 29 is connected to the secondary coil of the ignition coil assembly 45. The superpose voltage generation circuit 47 is adapted to boost a voltage of the battery 43 to a predetermined superpose voltage level and, after the initiation of a discharge of the ignition plug 29, output the superpose voltage to the ignition plug 29 according to a control signal from the superpose voltage control unit 42. Herein, the superpose voltage is applied by the superpose voltage generation circuit 47, during the interruption of the primary current to the primary coil, in the same direction as the discharge voltage originally applied between electrodes of the ignition plug 29.

Figure 4:
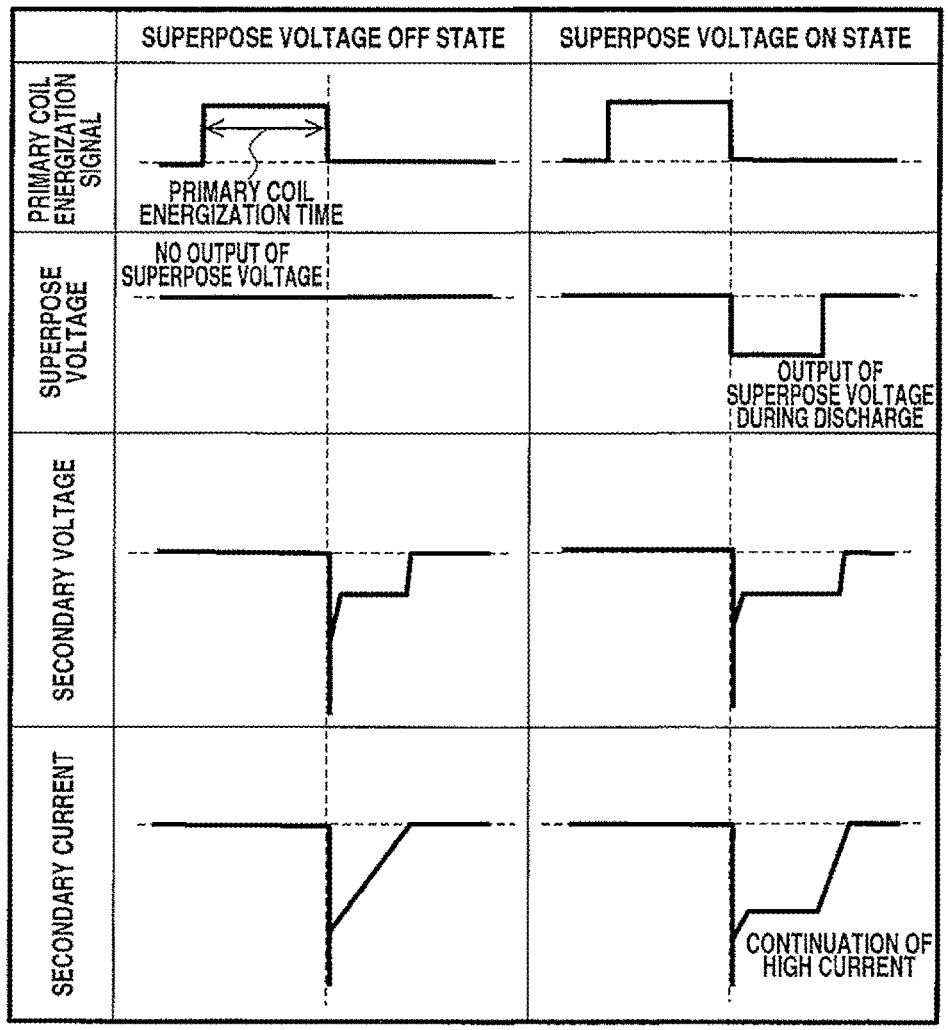
FIG. 4 is a schematic diagram showing the waveform of a secondary voltage etc. during the application and non-application of a superpose voltage.

FIG. 4 shows changes in the waveforms of the primary current (primary coil energization current), the superpose voltage, the secondary voltage (discharge voltage) and the secondary current during the application and non-application of the superpose voltage.

In the case of not applying the superpose voltage, the ignition unit 41 performs the same function as an ordinary ignition device. Namely, the ignition unit 41 supplies the primary current to the primary coil of the ignition coil assembly 45 via the igniter 46 for a predetermined energization time and develops the high discharge voltage across the secondary coil of the ignition coil assembly 45 by interruption of the primary current. With the application of such a high voltage, the discharge is generated between the electrodes of the ignition plug 29 in association with electrical breakdown of air-fuel mixture. The secondary current between the electrodes of the ignition plug 29 is reduced relatively sharply in a triangular waveform with the passage of time from the initiation of the discharge.

In the case of applying the superpose voltage, the ignition unit 41 initiates the application of the constant superpose voltage approximately simultaneously with the interruption of the primary current. As the constant superpose voltage is superposed on the secondary voltage for a predetermined time, the secondary voltage can be maintained at a high level for a relatively long time period from the initiation of the discharge as shown in the drawing. It is thus possible to achieve a longer continuation of the discharge current as a superposed discharge.

Figure 5:
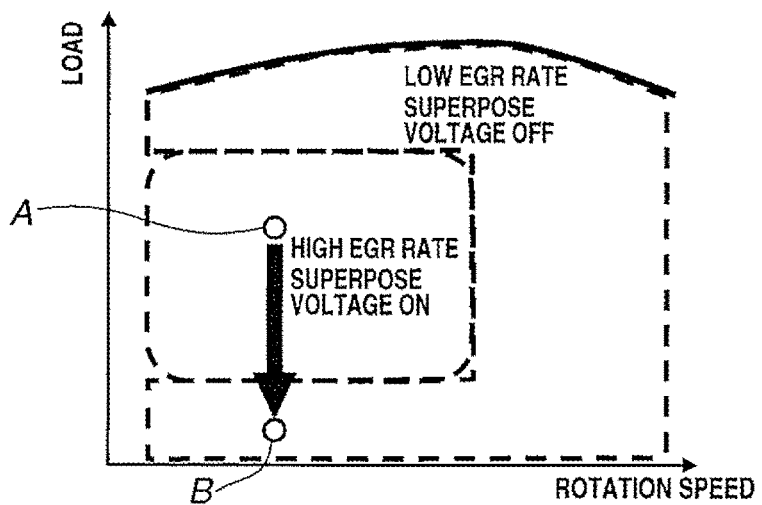
FIG. 5 is a characteristic diagram showing one example of range shift with decrease in load.

In the present embodiment, the superpose voltage is turned on or off based on the operation status of the internal combustion engine 1, which is defined by the load and rotation speed of the internal combustion engine 1, in accordance with the settings of exhaust gas recirculation. As schematically shown in FIG. 5, the low/middle-speed, middle-load engine operation range is set as a superposed discharge activation range where the superpose voltage is applied; and the other high/low-load engine operation range is set as a superposed discharge deactivation range where the superpose voltage is not applied. The superposed discharge deactivation range corresponds to where the recirculation of exhaust gas through the exhaust gas recirculation passage 13 (called "external EGR") is not performed or is performed at a low exhaust gas recirculation rate. The superposed discharge activation range corresponds to where the recirculation of exhaust gas is performed at a relatively high exhaust gas recirculation rate.

In the spark-ignition internal combustion engine with the throttle valve 5, the recirculation of a large amount of exhaust gas into the combustion chamber leads to improvement in fuel efficiency by reduction of pumping loss. On the other hand, the recirculation of such inert exhaust gas leads to a deterioration in ignition performance. It is however possible to attain good ignition performance when the superposed discharge is performed with the application of the superpose voltage during the above high-rate exhaust gas recirculation.

It is now considered that the engine load is decreased from point A of the superposed discharge activation range to point B of the superposed discharge deactivation range in response to driver's accelerator pedal operation or the like as shown by an arrow in FIG. 5. Upon the shift of the operation status, the target exhaust gas recirculation rate is changed from a high exhaust gas recirculation rate value to a low exhaust gas recirculation rate value (or zero). In conjunction with such change in the exhaust gas recirculation rate, the superposed discharge is switched from activation to deactivation. At this time, there is caused a delay in switching between the activation and deactivation of the superposed discharge in the present embodiment.

Figure 6:
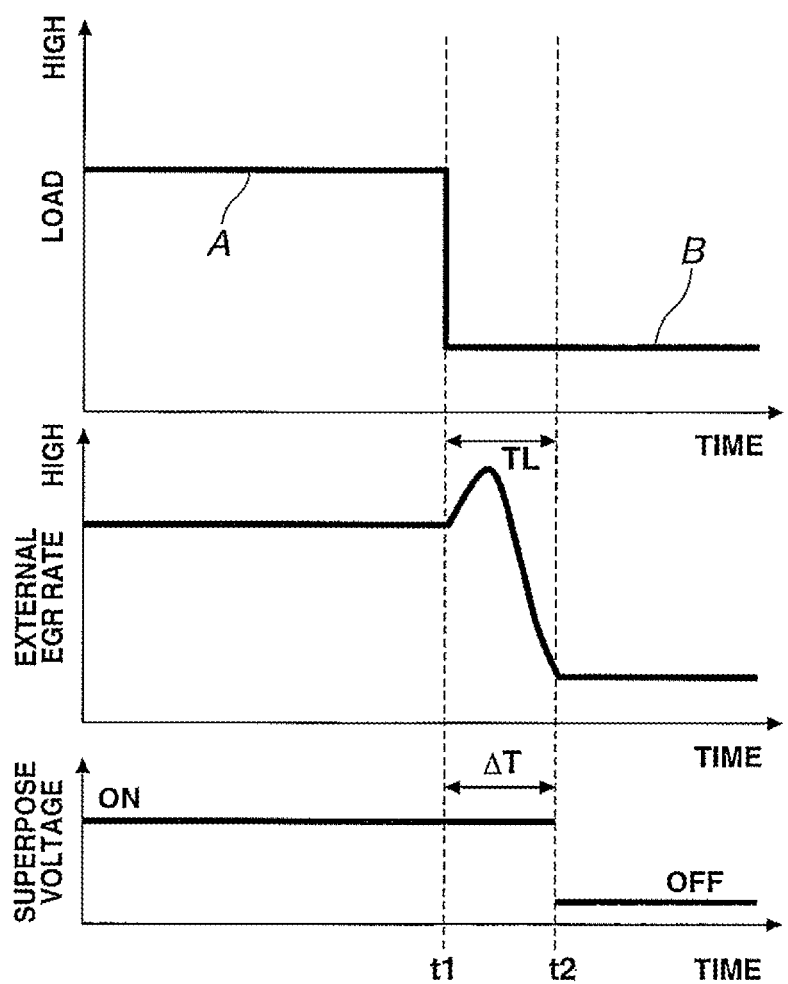
FIG. 6 is a time chart showing a first example of switching control at the range shift of FIG. 5.

FIG. 6 is a time chart showing changes in the engine load and the exhaust gas recirculation rate under the on-off control (application or non-application) of the superpose voltage in a transition state upon the shift of the operation status from point A to point B of FIG. 5. In this case, the opening of the exhaust gas recirculation control valve 14 is abruptly decreased when the operation status shifts from the superposed discharge activation range into the superposed discharge deactivation range at time t1. Then, the target exhaust gas recirculation rate is changed in a stepwise manner. By contrast, the actual exhaust gas recirculation rate is relatively slowly changed and reaches, at time t2, the target exhaust gas recirculation rate value for point B. In the present embodiment, a period TL from time t1 to time t2 required for the exhaust gas recirculation rate to reach a steady-state value corresponding to the operation status after the range shift is referred to as "exhaust gas recirculation transition period".

In the transition state of FIG. 5, however, there occurs a phenomenon where the actual exhaust gas recirculation rate is unintentionally increased in the initial stage of the exhaust gas recirculation transition period TL. The reason for this phenomenon is as follows. The relatively large volumetric space, such as part of the exhaust gas recirculation passage 13 and the collector portion 2a, is present on the downstream side of the exhaust gas recirculation control valve 14 as shown in FIG. 1. The exhaust gas existing in such a space flows into the combustion chamber with some delay after the decrease of the opening of the exhaust gas recirculation control valve 14 (or after the closing of the exhaust gas recirculation control valve 14). Simultaneously, the intake air amount decreases with decrease in the load (and, more specifically, decrease in the opening of the throttle valve 5). In consequence, the exhaust gas recirculation rate in the combustion chamber becomes temporarily increased. If the superposed discharge is stopped at time t1 simultaneously with the range shift, there is a possibility of occurrence of misfiring due to excessive exhaust gas recirculation rate.

In order to avoid such misfiring, the on-off control of the superpose voltage is delayed by a delay time ΔT, which is substantially equal to the exhaust gas recirculation transition period TL, in the embodiment of FIG. 6. In other words, the superposed discharge is continued until the lapse of the delay time ΔT and is stopped at the time when the delay time ΔT has elapsed (i.e. at substantially the same time as time t2).

Figure 7:
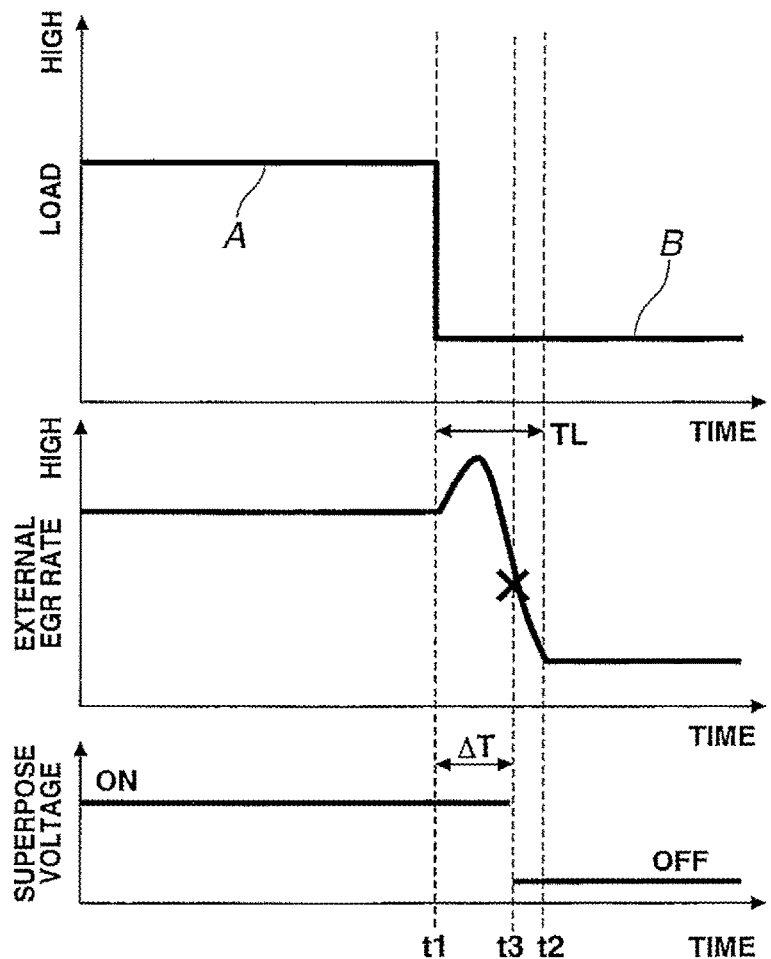
FIG. 7 is a time chart showing a second example of switching control at the range shift of FIG. 5.

FIG. 7 shows a different setting of the delay time ΔT. In the embodiment of FIG. 7, the delay time ΔT is set slightly shorter than the exhaust gas recirculation transition period TL. In other words, the superposed discharge is stopped at time t3 before time t2 at which the exhaust gas recirculation rate reaches the steady-state value corresponding to the operation status after the range shift. In this case, the delay time ΔT is set such that the actual exhaust gas recirculation rate is decreased to a level that does not cause misfiring even at the stop of the superposed discharge.

It is accordingly possible in the embodiment of FIG. 6 to reliably avoid the occurrence of misfiring. It is further possible in the embodiment of FIG. 7 to, while avoiding the occurrence of misfiring in the initial stage of the transition period, suppress the discharge energy as compared to the embodiment of FIG. 6.

Herein, the discharge energy of the superposed discharge applied during the delay time ΔT can be set to the same level as that before time t1 or can be set to a higher level than that before time t1 so as to more reliably avoid the occurrence of misfiring due to increase in exhaust gas recirculation rate. The setting method of the discharge energy will be explained in detail later.

Figure 8:
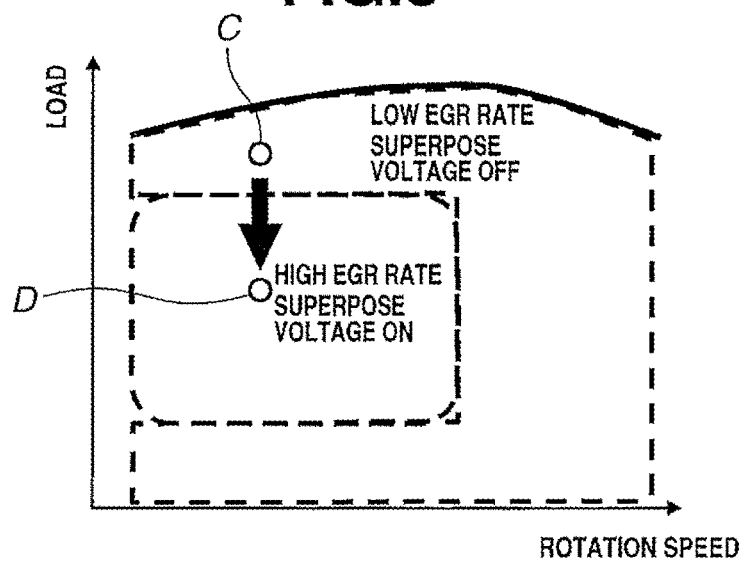
FIG. 8 is a characteristic diagram showing another example of range shift with decrease in load.
Figure 9:
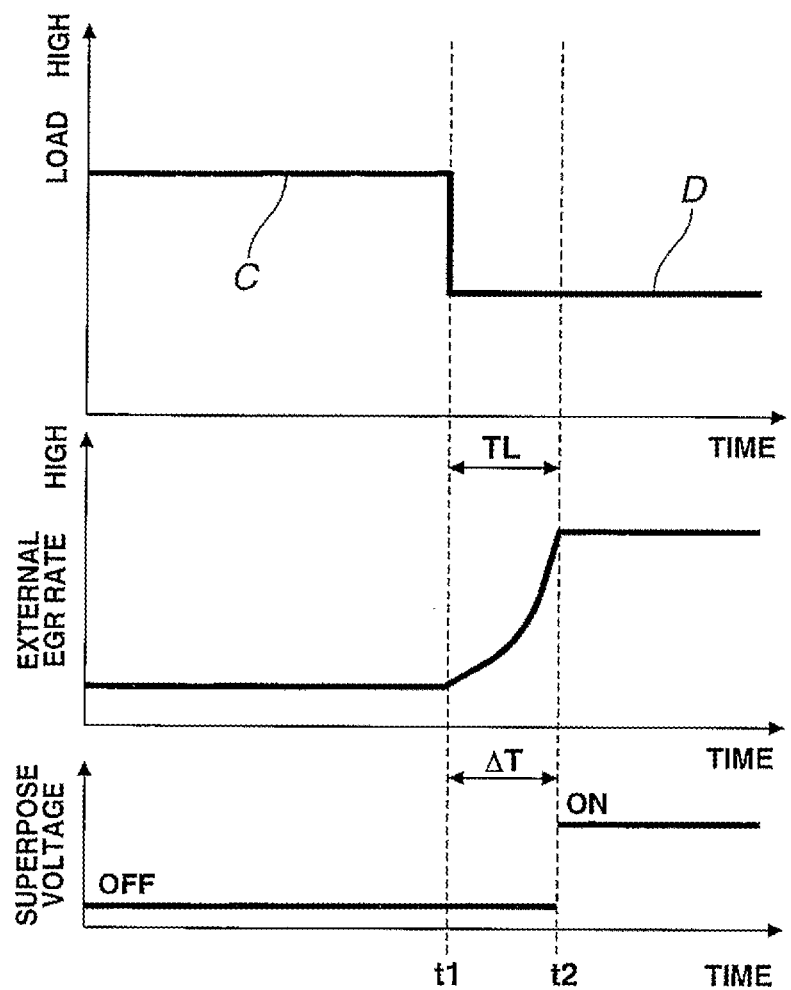
FIG. 9 is a time chart showing a first example of switching control at the range shift of FIG. 8.
Figure 10:
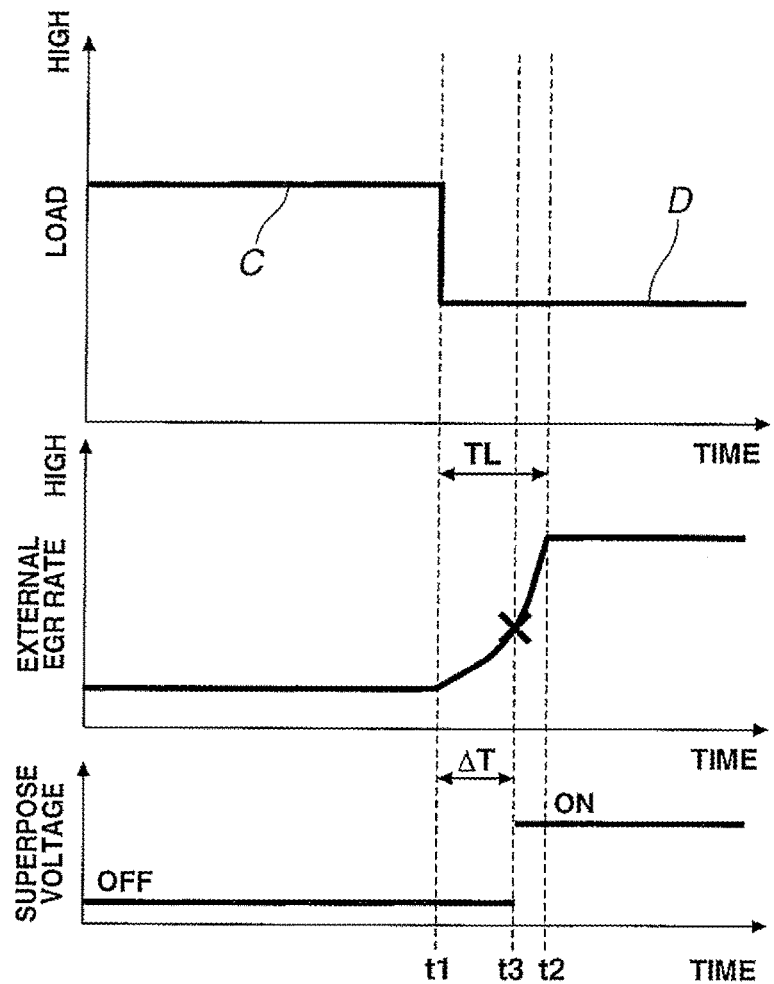
FIG. 10 is a time chart showing a second example of switching control at the range shift of FIG. 8.

Next, referring to FIGS. 8 to 10, it is considered that the operation status shifts from point C of the superposed discharge deactivation range to point D of the superposed discharge activation range (as shown by an arrow in FIG. 8) with decrease in the load.

Upon the shift of the operation status at time t1, the target exhaust gas recirculation rate is changed from a low exhaust gas recirculation rate value (or zero) to a high exhaust gas recirculation rate value. By contrast, the actual exhaust gas recirculation rate in the combustion chamber is relatively slowly changed and reaches, at time t2, the target high exhaust gas recirculation rate value as shown in FIGS. 9 and 10. If the superposed discharge is initiated at time t1, the superposed discharge is redundantly performed to cause waste of discharge energy.

The on-off control of the superpose voltage is thus delayed by a delay time ΔT, which is substantially equal to the exhaust gas recirculation transition period TL from time t1 to time t2, in the embodiment of FIG. 9 as in the above-mentioned embodiment of FIG. 6. In other words, the superposed discharge is not performed until time t2 and initiated at time t2 at which the exhaust gas recirculation rate actually reaches the high value.

As shown in FIG. 10, it is alternatively feasible to set the delay time ΔT slightly shorter than the transient exhaust gas recirculation period TL as in the above-mentioned embodiment of FIG. 7. In other words, the superposed discharge is initiated at time t3 before time t2 at which the exhaust gas recirculation rate reaches the steady-state value corresponding to the operation status after the range shift.

It is accordingly possible in the embodiment of FIG. 9 to obtain maximum reduction of the discharge energy. It is further possible in the embodiment of FIG. 10 to, while suppressing the discharge energy, reliably avoid the occurrence of misfiring at the time when the exhaust gas recirculation rate becomes close to the high exhaust gas recirculation rate value corresponding to the operation status after the range shift.

In the embodiment of FIG. 10, the discharge energy of the superposed discharge applied during the period from time t3 to time t2 can be set to the same level as that after time t2 or can be set to a lower level than that after time t2 so as to more effectively avoid waste of discharge energy.

Figure 11:
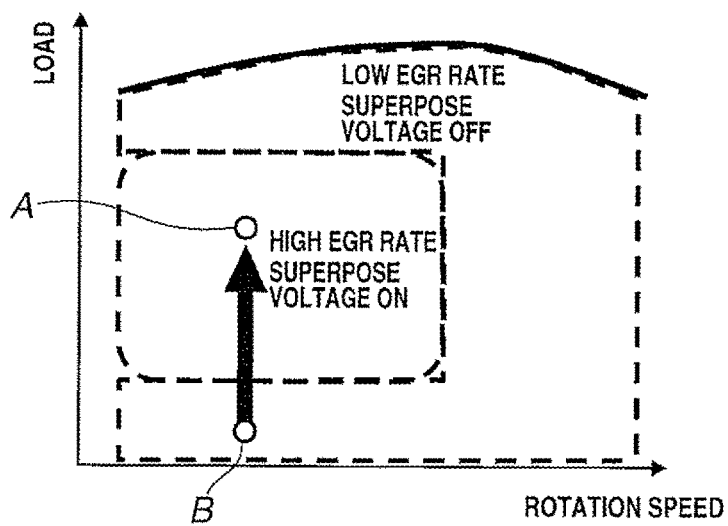
FIG. 11 is a characteristic diagram showing one example of range shift with increase in load.
Figure 12:
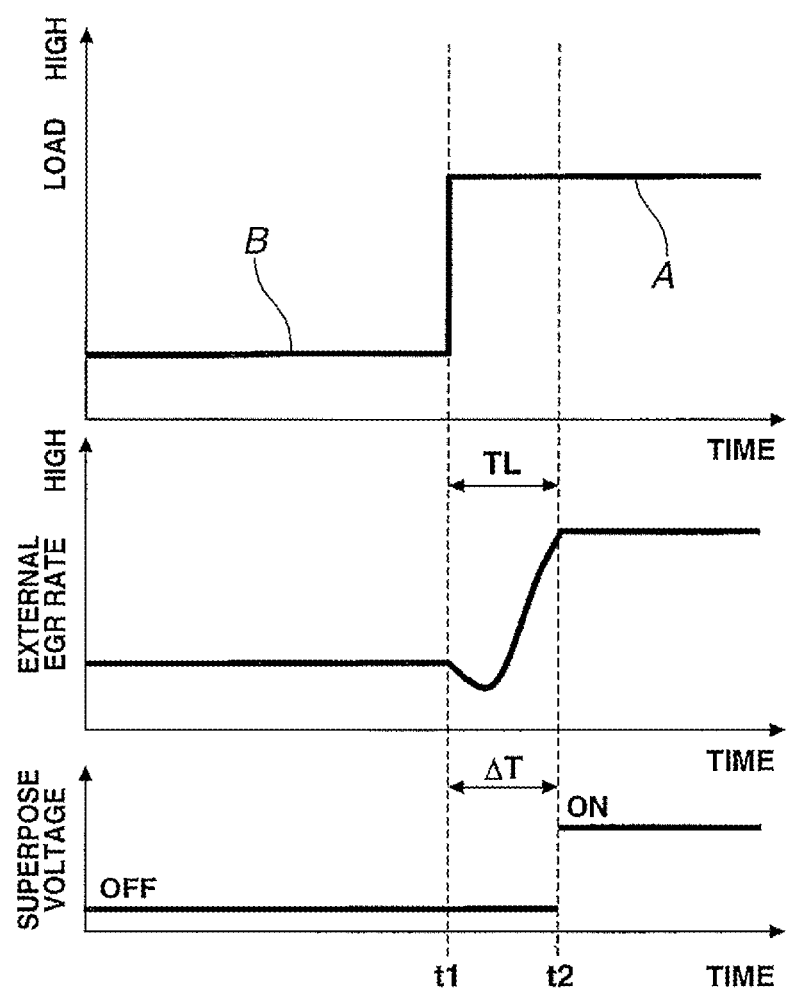
FIG. 12 is a time chart showing a first example of switching control at the range shift of FIG. 11.
Figure 13:
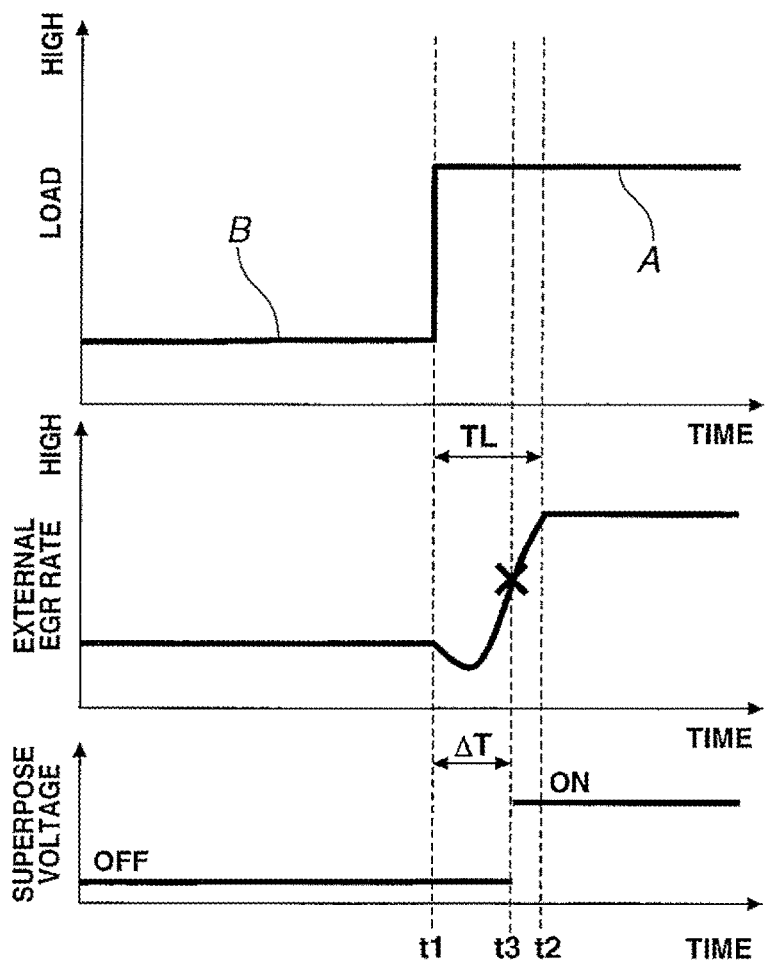
FIG. 13 is a time chart showing a second example of switching control at the range shift of FIG. 11.

Referring to FIGS. 11 to 13, it is considered that the operation status shifts from point B of the superposed discharge deactivation range to point A of the superposed discharge activation range (as shown by an arrow in FIG. 11) with increase in the load.

Upon the shift of the operation status at time t1, the target exhaust gas recirculation rate is changed from a low exhaust gas recirculation rate value (or zero) to a high exhaust gas recirculation rate value. By contrast, the actual exhaust gas recirculation rate in the combustion chamber is changed relatively slowly and reaches, at time t2, the target high exhaust gas recirculation rate value as shown in FIGS. 12 and 13. In particular, the actual exhaust gas recirculation rate in the combustion chamber becomes temporarily decreased to a lower value, and then, gradually increased as the intake air amount increases with increase in the load. If the superposed discharge is initiated at time t1, the superposed discharge is redundantly performed to cause waste of discharge energy.

The on-off control of the superpose voltage is thus delayed by a delay time ΔT, which is substantially equal to the exhaust gas recirculation transition period TL from time t1 to time t2, in the embodiment of FIG. 12 as in the above-mentioned embodiment of FIG. 9. In other words, the superposed discharge is not performed until time t2 and initiated at time t2 at which the exhaust gas recirculation rate actually reaches the high value.

As shown in FIG. 13, it is alternatively feasible to set the delay time ΔT slightly shorter than the exhaust gas recirculation transition period TL as in the above-mentioned embodiment of FIG. 10. In other words, the superposed discharge is initiated at time t3 before time t2 at which the exhaust gas recirculation rate reaches the steady-state value corresponding to the operation status after the range shift.

It is accordingly possible in the embodiment of FIG. 12 to obtain maximum reduction of the discharge energy. It is further possible in the embodiment of FIG. 13 to, while suppressing the discharge energy, reliably avoid the occurrence of misfiring at the time when the exhaust gas recirculation rate becomes close to the high exhaust gas recirculation rate value corresponding to the operation status after the range shift.

In the embodiment of FIG. 13, as in the above-mentioned embodiment of FIG. 10, the discharge energy of the superposed discharge applied during the period from time t3 to time t2 can be set to the same level as that after time t2 or can be set to a lower level than that after time t2 so as to more effectively avoid waste of discharge energy.

Figure 14:
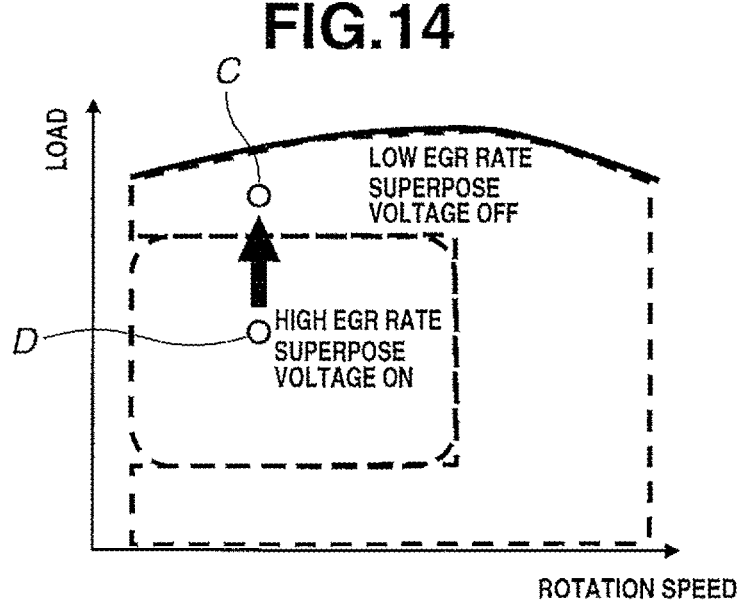
FIG. 14 is a characteristic diagram showing another example of range shift with increase in load.
Figure 15:
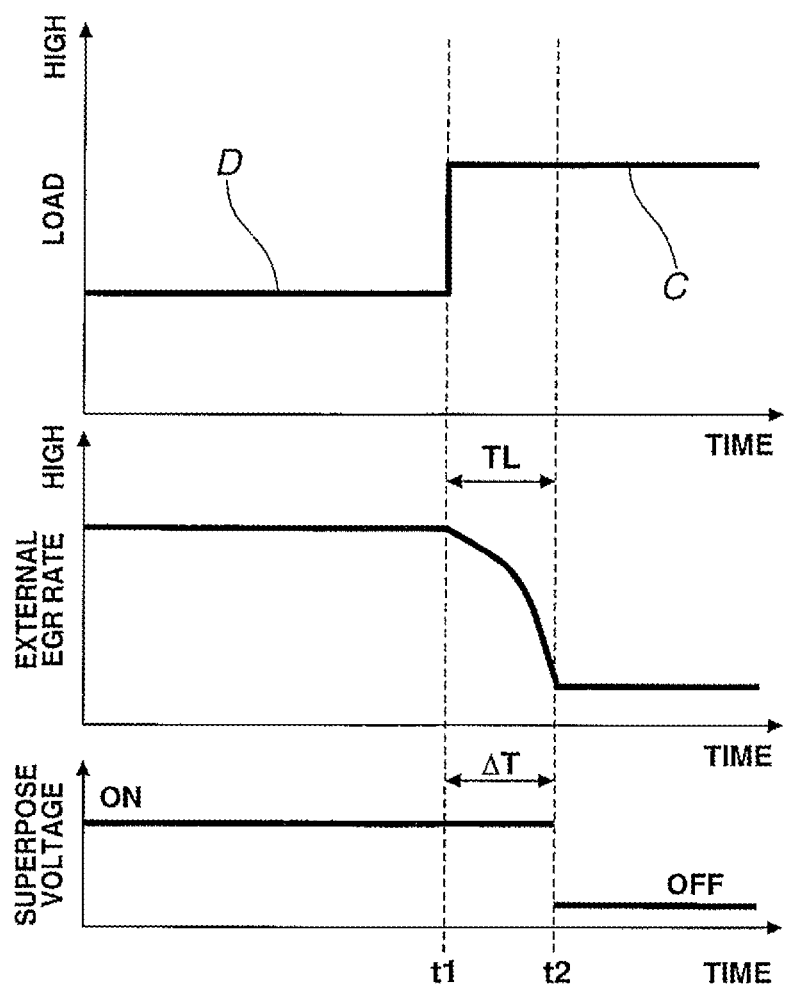
FIG. 15 is a time chart showing a first example of switching control at the range shift of FIG. 14.
Figure 16:
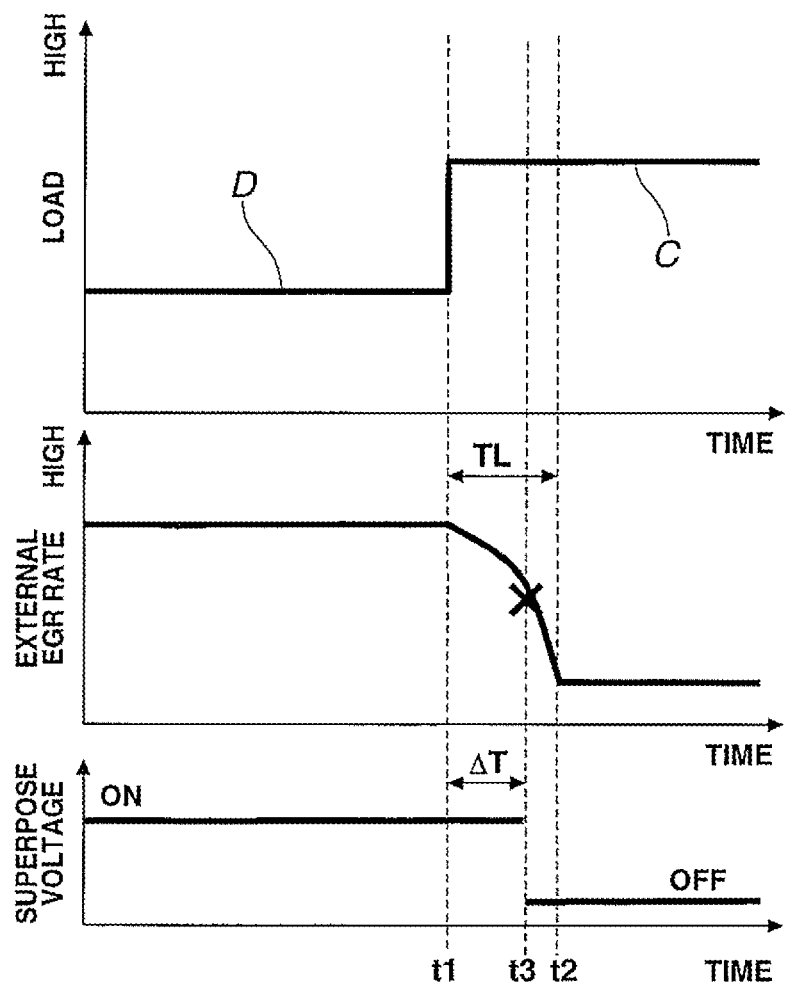
FIG. 16 is a time chart showing a second example of switching control at the range shift of FIG. 14.

Referring to FIGS. 14 to 16, it is further considered that the operation status shifts from point D of the superposed discharge activation range to point C of the superposed discharge deactivation range (as shown by an arrow in FIG. 14) with increase in the load.

Upon the shift of the operation status at time t1, the target exhaust gas recirculation rate is changed from a high exhaust gas recirculation rate value to a low exhaust gas recirculation rate value (or zero). By contrast, the actual exhaust gas recirculation rate in the combustion chamber is changed relatively slowly and reaches, at time t2, the target low exhaust gas recirculation rate value as shown in FIGS. 15 and 16. As the intake air amount increases with increase in the load, the exhaust gas recirculation rate does not become temporarily increased as in the embodiments of FIGS. 6 and 7. Nevertheless, the decrease of the exhaust gas recirculation rate is slow. There is still a possibility of occurrence of misfiring if the superposed discharge is stopped at time t1.

The on-off control of the superpose voltage is thus delayed by a delay time ΔT, which is substantially equal to the exhaust gas recirculation transition period TL, in the embodiment of FIG. 15 as in the above-mentioned embodiment of FIG. 6. In other words, the superposed discharge is continued until time t2 and stopped at time t2 at which the exhaust gas recirculation rate actually reaches the low value.

As shown in FIG. 16, it is alternatively feasible to set the delay time ΔT slightly shorter than the transient exhaust gas recirculation period TL as in the above-mentioned embodiment of FIG. 7. In other words, the superposed discharge is stopped at time t3 before time t2 at which the exhaust gas recirculation rate reaches the steady-state value corresponding to the operation status after the range shift.

It is accordingly possible in the embodiment of FIG. 15 to reliably avoid the occurrence of misfiring as in the embodiment of FIG. 7. It is further possible in the embodiment of FIG. 16 as in the embodiment of FIG. 7 to, while avoiding the occurrence of misfiring in the initial stage of the transient period, suppress the discharge energy as compared to the embodiment of FIG. 16.

The discharge energy of the superposed discharge applied during the delay time ΔT can be set to the same level as that before time t1 or can be set to a higher level than that before time t1 in the same manner as mentioned above.

Figure 17:
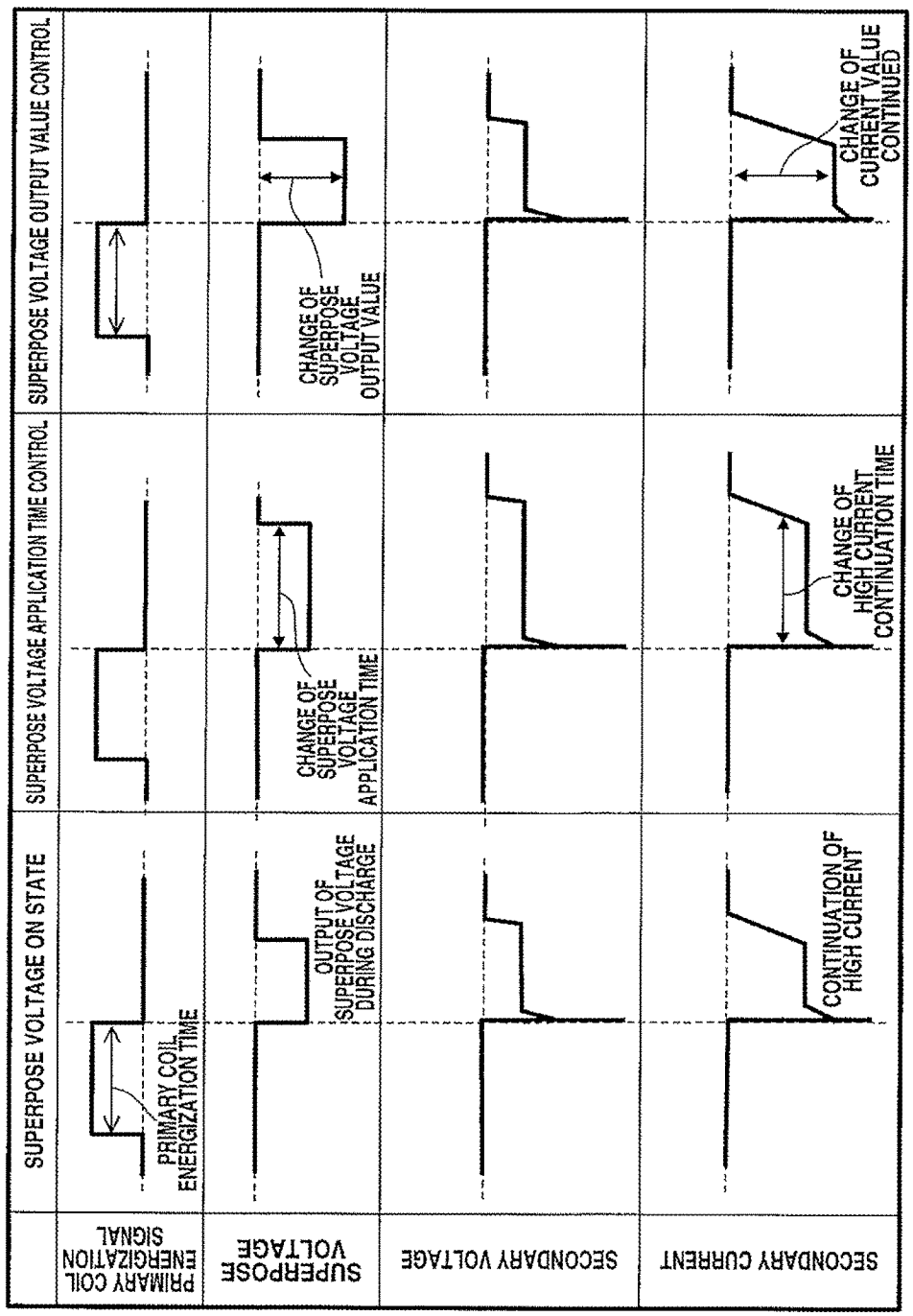
FIG. 17 is a schematic diagram showing the waveform of a secondary voltage etc. during control of superpose voltage application time and output value.

In each of the above-mentioned embodiments, the discharge energy is set by controlling the application time of the superpose voltage or the output value of the superpose voltage applied as shown in FIG. 17.

FIG. 17 shows changes in the waveforms of the primary current (primary coil energization current), the superpose voltage, the secondary voltage and the secondary current as in FIG. 14. The left column of FIG. 17 shows the basic characteristics of the superposed discharge. The center column of FIG. 17 shows the characteristics of the superposed discharge in the case where the application time of the superpose voltage is set longer. This makes it possible to maintain the secondary current at a high level for a longer time so as to impart greater energy to air-fuel mixture. The right column of FIG. 17 shows the characteristics of the superposed discharge in the case where the output value of the superpose voltage is set higher than that for the basic characteristics. This makes it possible to maintain the secondary energy at a higher level so as to impart greater energy to air-fuel mixture. Although the method for increase of the discharge energy has been explained above, it is feasible to decrease the discharge energy to a lower level by a similar method in the embodiment of FIG. 10 etc.

Furthermore, the delay time ΔT may be determined as a fixed period (fixed time, fixed crank angle etc.) or may be determined as optimum for each operation status in view of the engine operation parameters (load and rotation speed).

In the case where the execution/non-execution or the degree of execution of exhaust gas recirculation varies depending on e.g. the temperature conditions of the internal combustion engine 1, the superposed discharge activation range and the superposed discharge deactivation range are set in accordance with the actual settings of exhaust gas recirculation in view of the temperature conditions.

The present invention can be applied to the case where the so-called internal exhaust gas recirculation system is used to perform the exhaust gas recirculation by control of the valve overlap between the intake and exhaust valves 24 and 26 although the above embodiment refers to the case where the exhaust gas recirculation is performed by means of the so-called external exhaust gas recirculation system with the exhaust gas recirculation passage 13. In the external exhaust gas recirculation system, there is a larger influence of the volumetric capacity downstream of the exhaust gas recirculation valve 14 so that it is necessary to set the delay time ΔT to a longer value for prevention of misfiring.

The invention claimed is:
1. An ignition control system for an internal combustion engine, comprising an ignition coil assembly having primary and secondary coils and an ignition plug connected to the secondary coil,
wherein the ignition control system is configured to, after supply of a primary current to the primary coil, allow the secondary coil to apply a discharge voltage between electrodes of the ignition plug by interruption of the primary current,
wherein the ignition control system further comprises a superposed voltage generation circuit configured to, after the initiation of a discharge with the application of the discharge voltage by the secondary coil, apply a superposed voltage between the electrodes of the ignition plug in the same direction as the discharge voltage so as to continue a discharge current as a superposed discharge,
wherein the ignition control system is configured to set superposed discharge activation and deactivation ranges based on (i) a load and a rotation speed of the internal combustion engine, and at least one of (ii) execution or non-execution of exhaust gas recirculation or (iii) a degree of execution of exhaust gas recirculation, such that the superposed discharge deactivation range has a higher engine rotation speed, a higher or lower engine load, and a lower exhaust gas recirculation rate than the respective engine rotation speed, engine load and exhaust gas recirculation rate of the superposed discharge activation range,
wherein the superposed voltage generation circuit is configured to turn the superposed voltage on in the superposed discharge activation range and turn the superposed voltage off in the superposed discharge deactivation range, and
wherein the ignition control system is configured to switch between activation and deactivation of the superposed discharge after a predetermined delay time in a transition state upon shift from one of the superposed discharge activation range and the superposed discharge deactivation range to the other range.

2. The ignition control system for the internal combustion engine according to claim 1, wherein the ignition control system is further configured such that the delay time equals an exhaust gas recirculation transition period during which the degree of exhaust gas recirculation in a combustion chamber reaches a steady state corresponding to the operation status after the shift.

3. The ignition control system for the internal combustion engine according to claim 1, wherein the ignition control system is further configured such that the delay time ends in a mid-course of an exhaust gas recirculation transition period during which the degree of exhaust gas recirculation in a combustion chamber reaches a steady state corresponding to the operation status after the shift.

4. The ignition control system for the internal combustion engine according to claim 1, wherein the ignition control system is further configured such that, at the shift from the superposed discharge activation range to the superposed discharge deactivation range with decrease in load, the level of discharge energy of the superposed voltage applied during the delay time is the same as that before the shift.

5. The ignition control system for the internal combustion engine according to claim 1, wherein the ignition control system is further configured such that, at the shift from the superposed discharge activation range to the superposed discharge deactivation range with decrease in load, the level of discharge energy of the superposed voltage applied during the delay time is higher than that before the shift.

6. The ignition control system for the internal combustion engine according to claim 3, wherein the ignition control system is further configured such that, at the shift from the superposed discharge deactivation range to the superposed discharge activation range with decrease in load, the level of discharge energy of the superposed voltage initiated in the mid-course of the exhaust gas recirculation is the same as that after the shift.

7. The ignition control system for the internal combustion engine according to claim 3, wherein the ignition control system is further configured such that, at the shift from the superposed discharge deactivation range to the superposed discharge activation range with decrease in load, the level of discharge energy of the superposed voltage initiated in the mid-course of the exhaust gas recirculation is lower than that after the shift.

8. The ignition control system for the internal combustion engine according to claim 3, wherein the ignition control system is further configured such that, at the shift from the superposed discharge deactivation range to the superposed discharge activation range with increase in load, the level of discharge energy of the superposed voltage initiated in the mid-course of the exhaust gas recirculation is the same as that after the shift.

9. The ignition control system for the internal combustion engine according to claim 3, wherein the ignition control system is further configured such that, at the shift from the superposed discharge deactivation range to the superposed discharge activation range with increase in load, the level of discharge energy of the superposed voltage initiated in the mid-course of the exhaust gas recirculation is lower than that after the shift.

10. The ignition control system for the internal combustion engine according to claim 1, wherein the ignition control system is further configured such that, at the shift from the superposed discharge activation range to the superposed discharge deactivation range with increase in load, the level of discharge energy of the superposed voltage applied during the delay time is the same as that before the shift.

11. The ignition control system for the internal combustion engine according to claim 1, wherein the ignition control system is further configured such that, at the shift from the superposed discharge activation range to the superposed discharge deactivation range with increase in load, the level of discharge energy of the superposed voltage applied during the delay time is lower than that before the shift.

12. An ignition control method for an internal combustion engine, the internal combustion engine comprising an ignition coil assembly having primary and secondary coils and an ignition plug connected to the secondary coil so as to allow, after supply of a primary current to the primary coil, the secondary coil to apply a discharge voltage between electrodes of the ignition plug by interruption of the primary current, the ignition control method comprising:
   after initiation of a discharge with application of the discharge voltage by the secondary coil, applying a superposed voltage between the electrodes of the ignition plug in the same direction as the discharge voltage so as to continue a discharge current as a superposed discharge; and
   setting superposed discharge activation and deactivation ranges based on (i) a load and a rotation speed of the internal combustion engine, and at least one of (ii) execution or non-execution of exhaust gas recirculation or (iii) a degree of execution of exhaust gas recirculation, such that the superposed discharge deactivation range has a higher engine rotation speed, a higher or lower engine load, and a lower exhaust gas recirculation rate than the respective engine rotation speed, engine load and exhaust gas recirculation rate of the superposed discharge activation range,
   wherein the method further comprises turning the superposed voltage on in the superposed discharge activation range and turning the superposed voltage off in the superposed discharge deactivation range; and
   wherein the method further comprises switching between activation and deactivation of the superposed discharge after a predetermined delay time in a transition state upon shift from one of the superposed discharge activation range and the superposed discharge deactivation range to the other range.

* * * * *